United States Patent
Erdl et al.

(10) Patent No.: US 10,967,779 B2
(45) Date of Patent: Apr. 6, 2021

(54) LIGHTING APPARATUS FOR A MOTOR VEHICLE

(71) Applicant: Bayerische Motoren Werke Aktiengesellschaft, Munich (DE)

(72) Inventors: Helmut Erdl, Flintsbach (DE); Abdelmalek Hanafi, Munich (DE); Reinhard Seifried, Unterhaching (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/808,795

(22) Filed: Mar. 4, 2020

(65) Prior Publication Data
US 2020/0198521 A1 Jun. 25, 2020

Related U.S. Application Data

(63) Continuation of application No. PCT/EP2018/076016, filed on Sep. 25, 2018.

(30) Foreign Application Priority Data

Nov. 2, 2017 (DE) ...................... 10 2017 219 504.5

(51) Int. Cl.
*B60Q 1/00* (2006.01)
*F21S 41/24* (2018.01)
(Continued)

(52) U.S. Cl.
CPC ............ *B60Q 1/0011* (2013.01); *F21S 41/13* (2018.01); *F21S 41/16* (2018.01); *F21S 41/176* (2018.01);
(Continued)

(58) Field of Classification Search
CPC .......... B60Q 1/0011; B60Q 1/14; B60Q 1/28; B60Q 1/34; B60Q 1/44; B60Q 1/486;
(Continued)

(56) References Cited

U.S. PATENT DOCUMENTS 5,365,413 A 11/1994 Krammer
5,386,250 A 1/1995 Guerinot
(Continued)

FOREIGN PATENT DOCUMENTS

DE 33 19 179 A1 1/1985
DE 694 25 025 T2 2/2001
(Continued)

OTHER PUBLICATIONS

WO 2013/099144, Sato et al, Apr. 7, 2013, Vehicle Lighting Device, English Translation (Year: 2013).*
(Continued)

*Primary Examiner* — Peggy A Neils
(74) *Attorney, Agent, or Firm* — Crowell & Moring LLP

(57) ABSTRACT

A lighting device for a motor vehicle has a laser light source from the light of which light radiation is generated into the area around the motor vehicle during operation of the lighting device. In the lighting device, a plurality of optical channels is associated with the laser light source, and the light of the laser light source can be guided via each optical channel in order to generate a separate light spread associated with the optical channel from the guided light in the area around the motor vehicle. An optical element, which can be switched by a control device into different switching states, is provided between the laser light source and the plurality of optical channels. A different switching state is associated with each optical channel. In each respective switching state, light from the laser light source is fed only into the optical channel with which the respective switching state is associated, by means of the optical element.

17 Claims, 1 Drawing Sheet

(51) Int. Cl.

| | | |
|---|---|---|
| *F21S 41/675* | (2018.01) | |
| *F21S 43/237* | (2018.01) | |
| *F21S 41/176* | (2018.01) | |
| *F21S 43/40* | (2018.01) | |
| *F21S 41/16* | (2018.01) | |
| *F21S 43/30* | (2018.01) | |
| *F21S 41/13* | (2018.01) | |
| *F21S 43/16* | (2018.01) | |
| *F21S 41/64* | (2018.01) | |
| *F21S 41/20* | (2018.01) | |
| *F21Y 115/30* | (2016.01) | |
| *B60Q 1/14* | (2006.01) | |
| *B60Q 1/28* | (2006.01) | |
| *B60Q 1/34* | (2006.01) | |
| *B60Q 1/44* | (2006.01) | |
| *B60Q 1/48* | (2006.01) | |

(52) U.S. Cl.
CPC ............. *F21S 41/24* (2018.01); *F21S 41/285* (2018.01); *F21S 41/645* (2018.01); *F21S 41/675* (2018.01); *F21S 43/16* (2018.01); *F21S 43/237* (2018.01); *F21S 43/30* (2018.01); *F21S 43/40* (2018.01); *B60Q 1/14* (2013.01); *B60Q 1/28* (2013.01); *B60Q 1/34* (2013.01); *B60Q 1/44* (2013.01); *B60Q 1/486* (2013.01); *B60Q 2400/30* (2013.01); *F21Y 2115/30* (2016.08)

(58) Field of Classification Search
CPC ..... B60Q 2400/30; B60Q 11/00; F21S 41/24; F21S 41/675; F21S 43/237; F21S 41/176; F21S 43/40; F21S 41/16; F21S 43/30; F21S 41/13; F21S 43/16; F21S 41/645; F21S 41/285; F21S 41/25; F21S 43/00; F21S 43/235; F21Y 2115/30
See application file for complete search history.

(56) References Cited

U.S. PATENT DOCUMENTS

| | | | | |
|---|---|---|---|---|
| 8,256,941 | B2* | 9/2012 | Hikmet | F21S 41/645 |
| | | | | 362/513 |
| 9,441,812 | B2* | 9/2016 | Liao | F21S 41/321 |
| 9,869,443 | B2* | 1/2018 | Kimura | F21S 41/24 |
| 2006/0146552 | A1* | 7/2006 | Shaffer | B60Q 1/085 |
| | | | | 362/465 |
| 2006/0274288 | A1 | 12/2006 | Conner | |
| 2009/0279316 | A1 | 11/2009 | Hikmet et al. | |
| 2011/0216321 | A1 | 9/2011 | Kuratomi | |
| 2015/0137680 | A1 | 5/2015 | Komatsu et al. | |
| 2015/0160454 | A1 | 6/2015 | Bhakta | |
| 2016/0195232 | A1 | 7/2016 | Boinet | |
| 2016/0245471 | A1 | 8/2016 | Nakazato et al. | |
| 2016/0377252 | A1 | 12/2016 | Bhakta | |
| 2017/0097134 | A1 | 4/2017 | Akisada et al. | |
| 2017/0175968 | A1 | 6/2017 | Shimizu et al. | |
| 2017/0282785 | A1* | 10/2017 | Albou | F21S 41/675 |
| 2017/0334341 | A1 | 11/2017 | Kurashige et al. | |
| 2017/0350570 | A1* | 12/2017 | Schwaiger | F21S 41/16 |
| 2018/0356062 | A1 | 12/2018 | Mayer et al. | |
| 2019/0111107 | A1 | 4/2019 | Nordkild et al. | |
| 2020/0032976 | A1* | 1/2020 | Shimada | F21S 41/176 |
| 2020/0182425 | A1 | 6/2020 | Mouri et al. | |

FOREIGN PATENT DOCUMENTS

| | | |
|---|---|---|
| DE | 10 2006 045 692 A1 | 4/2008 |
| DE | 10 2013 221 067 A | 5/2015 |
| DE | 10 2016 200 590 A1 | 7/2017 |
| EP | 1 489 854 A2 | 12/2004 |
| EP | 2 955 428 A1 | 12/2015 |
| EP | 3 124 852 A1 | 2/2017 |
| EP | 3 133 336 A1 | 2/2017 |
| GB | 2474460 A | 4/2011 |
| JP | 2004-133312 A | 4/2004 |
| JP | 2004-302357 A | 10/2004 |
| JP | 2015-174551 A | 10/2015 |
| WO | WO 2008/109024 A1 | 9/2008 |
| WO | WO 2010/020930 A1 | 2/2010 |
| WO | WO 2013/099144 A1 | 7/2013 |
| WO | WO 2015/033764 A1 | 3/2015 |

OTHER PUBLICATIONS

International Search Report (PCT/ISA/210) issued in PCT Application No. PCT/EP2018/076016 dated Jan. 16, 2019 with English translation (six (6) pages).

German-language Written Opinion (PCT/ISA/237) issued in PCT Application No. PCT/EP2018/076016 dated Jan. 16, 2019 (six (6) pages).

German-language Search Report issued in German Application No. 10 2017 219 504.5 dated Oct. 9, 2018 with partial English translation (13 pages).

International Search Report (PCT/ISA/210) issued in PCT Application No. PCT/EP2018/076015 dated Jan. 31, 2019 with English translation (six (6) pages).

German-language Written Opinion (PCT/ISA/237) issued in PCT Application No. PCT/EP2018/076015 dated Jan. 31, 2019 (seven (7) pages).

German-language Search Report issued in German Application No. 10 2017 219 502.9 dated Feb. 21, 2018 with partial English translation (13 pages).

* cited by examiner

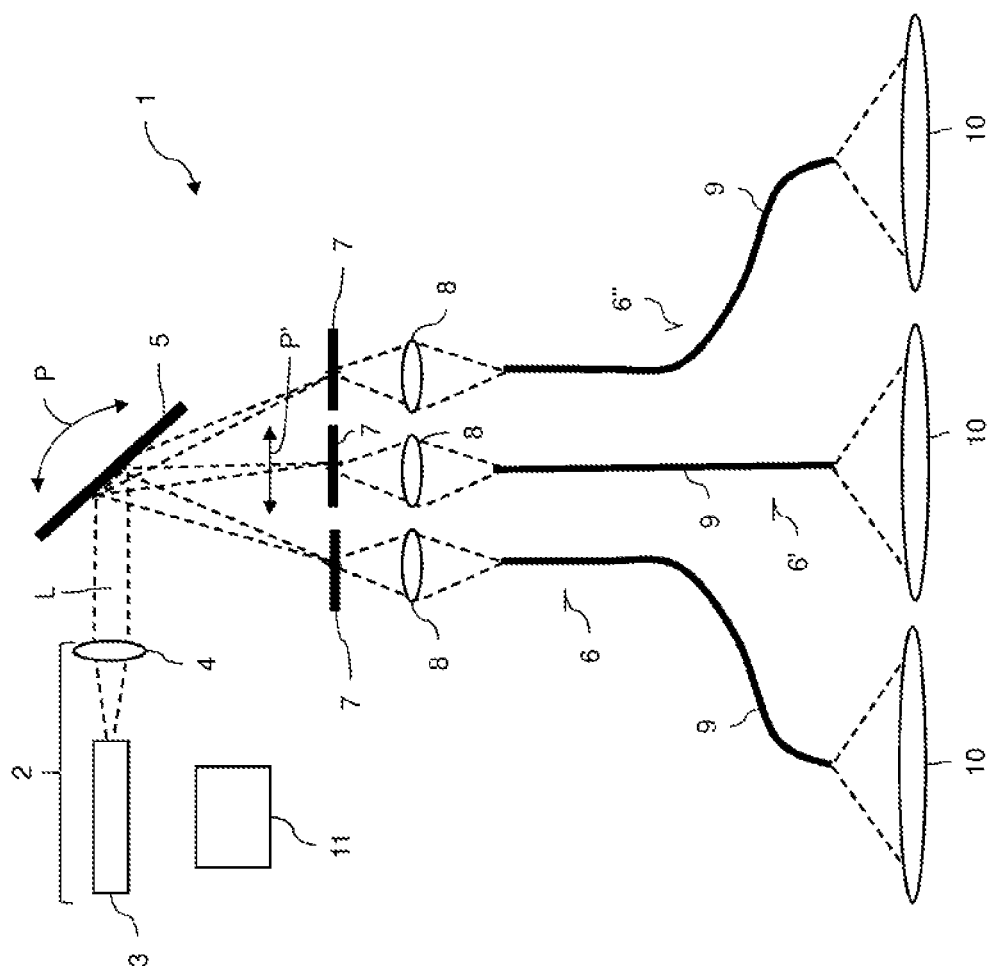

LIGHTING APPARATUS FOR A MOTOR VEHICLE

CROSS REFERENCE TO RELATED APPLICATIONS

This application is a continuation of PCT International Application No. PCT/EP2018/076016, filed Sep. 25, 2018, which claims priority under 35 U.S.C. § 119 from German Patent Application No. 10 2017 219 504.5, filed Nov. 2, 2017, the entire disclosures of which are herein expressly incorporated by reference.

BACKGROUND AND SUMMARY OF THE INVENTION

The invention relates to a lighting apparatus for a motor vehicle and to a corresponding motor vehicle.

Nowadays, laser light sources, which make it possible to generate light distributions in the area outside a motor vehicle with a very high brightness, are increasingly being used in lighting apparatuses for motor vehicles. For example, lighting apparatuses with laser light sources are used to generate high-beam light (for example anti-glare high-beam light) and low-beam light. A plurality of laser light sources are often installed in motor vehicle lighting apparatuses, with which laser light sources a respective separate optical channel is associated in order to generate a specific light distribution or to realize a specific light function using each combination of laser light source and optical channel. The use of a plurality of laser light sources and optical channels leads to a large installation space of the lighting apparatus.

It is the object of the invention to provide a lighting apparatus for a motor vehicle based on laser light, which makes it possible to generate a plurality of light distributions with a low installation space at the same time.

This object is achieved by way of the lighting apparatus in accordance with the claimed invention.

The lighting apparatus according to the invention is provided for a motor vehicle, such as for example a passenger motor vehicle and where appropriate also a truck. The lighting apparatus may represent for example a headlight and/or a taillight or parts thereof. The lighting apparatus comprises a laser light source, from the light of which light radiation is generated into the area around the motor vehicle during the operation of the lighting apparatus.

If, in the text that follows and in particular in the patent claims, interactions between the lighting apparatus and the motor vehicle or components of the motor vehicle are described, this is always intended to be understood to mean that the interaction occurs when the lighting apparatus is arranged or installed in the motor vehicle. The components of the lighting apparatus that are in corresponding interaction with the motor vehicle or components of the motor vehicle are therefore designed in such a way that the interaction is caused when the lighting apparatus is arranged or installed in the motor vehicle.

The lighting apparatus according to the invention is characterized in that a plurality of optical channels are associated with the laser light source, wherein the light of the laser light source can be guided via each optical channel in order to generate in the area around the motor vehicle a separate light distribution associated with the optical channel from the guided light. The term separate light distribution is to be understood here in such a way that the individual light distributions differ in at least one feature, in particular in the position and/or shape and/or the wave range of the light and/or the brightness of the light. The separate light distributions preferably represent different light functions of the motor vehicle, such as for example a flashing light, a daytime running light, a turning light and the like. Further light functions are specified further below.

In the lighting apparatus according to the invention, an optical element, which can be switched by way of a control device to different switching states, is provided between the laser light source and the plurality of optical channels, wherein a separate (that is to say a different) switching state is associated with each optical channel and, in a respective switching state, light of the laser light source is fed only into the optical channel with which the respective switching state is associated, by means of the optical element. In other words, in a respective switching state, the light to be fed into the optical channels is fed only to one of the optical channels. All of the light of the laser light source is preferably fed into the corresponding optical channel. Where appropriate, however, not all of the light of the laser light source can also be fed to an optical channel, wherein, however, it is to be ensured that light is fed only into one of the optical channels. Furthermore, the lighting apparatus according to the invention can also contain multiples of the combination of a laser light source, an optical element and a plurality of optical channels that has just been described.

The lighting apparatus according to the invention has the advantage that, owing to the use of an optical element in the manner of an optical switch, the light of a single laser light source can be fed into a plurality of optical channels, as a result of which a plurality of different light distributions can be generated using just one laser light source and the dimensions of the lighting apparatus are kept low as a result thereof.

In a further preferred configuration of the lighting apparatus according to the invention, the laser light source comprises a single laser diode, as a result of which the laser light source can be realized as a very compact component.

In a particularly preferred embodiment of the lighting apparatus according to the invention, a separate optical unit belongs to each optical channel, to which separate optical unit guided light is led in the respective optical channel in order to generate the light distribution associated with the respective optical channel with the aid of the optical unit. Said optical unit is also often referred to as a secondary optical unit and is a constituent part of the respective optical channel.

In a further preferred embodiment of the invention, the lighting apparatus is provided for generating light in the range visible to the human eye. The separate light distributions in this case preferably comprise one or more of the following light functions or parts thereof:

a flashing light, a daytime running light, a turning light, a parking light, a reverse light, a brake light, imagery in the surroundings of the motor vehicle, a low-beam light, a high-beam light.

The function of the imagery relates here to the generation of any symbols in the surroundings of the motor vehicle, for example on the ground in the surroundings of the motor vehicle.

Where appropriate, the lighting apparatus according to the invention can also be provided for generating light in the range not visible to the human eye, wherein in this case the light is preferably used for one or more driver assistance functions in the motor vehicle, for example in order to identify the distance to other road users by means of travel time measurement of the light. In particular, the lighting apparatus can in this case assume the light transmission function of a Lidar sensor.

In a further preferred embodiment, the control device of the lighting apparatus according to the invention can be operated in such a way that it cyclically switches over between at least two different, and, where applicable, also all, switching states of the optical element, with the result that in one cycle the light of the laser light source is fed into at least two, or all, optical channels. In this way, it is possible to achieve a situation in which a plurality of different light distributions are generated in parallel by way of the lighting apparatus according to the invention.

The repetition frequency of the cycles is preferably between 50 Hz and 2000 Hz, in particular between 500 Hz and 2000 Hz. Given such repetition frequencies, the switchover between the optical channels is no longer perceivable to the human eye, with the result that it is not possible for the observer to identify that different light distributions are generated at the same time using just one laser light source.

In a further preferred configuration, the optical element comprises a movable and in particular tiltable mirror, which can be moved into different switching positions corresponding to the switching states through actuation by means of the control device. Such mirrors are known per se from the prior art. In this case, the mirror is preferably realized as a microcomponent whose maximum extent in plan view on the mirror is 2 mm and below.

In a further embodiment, the optical element comprises a component with a variable refractive index, wherein the refractive index can be changed by means of the control unit through variation of a voltage fed to the component and the different switching states are effected by means of the change in the refractive index. Such components are known per se from the prior art and can also be realized as microcomponents with very low dimensions in the range of a few millimeters. In particular, the element with a variable refractive index can comprise an LCoS (liquid crystal on silicon) component.

In a particularly preferred embodiment, the optical element is what is known as a MEMS (microelectromechanical system) component. In this case, it is a very compact electronic component whose functionality is realized on a single semiconductor chip.

In a further preferred embodiment, each optical channel comprises an optical waveguide and in particular a single optical fiber, wherein light originating from the respective laser light source is led in the optical waveguide. The diameter of the optical waveguide is preferably between 50 μm and 200 μm.

In a further variant, at least some of the optical channels comprise one or more conversion elements in order to convert the light of the laser light source from one wavelength range to another wavelength range. Such conversion elements are known per se from the prior art and consist for example of a doped phosphor. A light distribution of a specific color or a white light distribution can be generated by means of such conversion elements in a simple manner. For example, using a conversion element, the light of a blue laser light source can be converted to white light. Where appropriate, a conversion element can be provided in each optical channel. By way of appropriately designed conversion elements, for example both a flashing light in a yellow color and a taillight in a red color or a low-beam light or high-beam light in a white color can be generated using a single laser light source.

In a further preferred configuration, the lighting apparatus comprises a light sensor system for detecting the light intensity in each optical channel, for example at the input or at the output of the optical channel. The control device is designed in this case in such a way that it evaluates the sensed light intensity.

In a preferred variant of the above embodiment, the control device is designed in such a way that it adjusts the switching states of the optical element with feedback to the light intensity detected by the light sensor system so that in the respective switching state the light intensity in the optical channel in which light of the laser light source is fed in exceeds a predetermined threshold. In this way, the optical element is suitably readjusted during the operation of the lighting apparatus.

As an alternative or in addition, the control device is designed in such a way that it detects a fault when the deviation (in terms of magnitude) between the light intensity, which is sensed by the light sensor system, in the optical channel in which light of the laser light source is fed in and a prescribed setpoint light intensity exceeds a predetermined threshold value, wherein the prescribed setpoint light intensity preferably depends on the operating state of the lighting apparatus, in particular on the operating power or energization of the laser light source. When a fault is detected, a fault message is preferably output in the motor vehicle via a user interface and/or a fault is logged in a fault memory of the motor vehicle. The operation of the lighting apparatus is monitored using the embodiment that has just been described.

The invention further relates to a motor vehicle, wherein the motor vehicle comprises one or more of the lighting apparatuses according to the invention or one or more preferred variants of the lighting apparatus according to the invention.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic illustration of an embodiment of an lighting apparatus according to the invention.

DETAILED DESCRIPTION OF THE DRAWING

The lighting apparatus 1 shown in FIG. 1 contains a single laser light source 2, which comprises a laser diode 3 and an auxiliary optical unit 4. The outline of the light radiation generated and deflected using the laser light source is indicated in FIG. 1 by dashed lines. Furthermore, the light radiation upon light exiting the laser light source 2 is denoted by the reference sign L. The lighting apparatus serves to realize three different light functions using the laser light of the laser diode. In this case, a separate optical channel is associated with the individual light functions, wherein the individual optical channels are denoted in FIG. 1 with reference signs 6, 6' and 6". Each optical channel contains a conversion element 7, which converts the wavelength range of incident laser light to another wave range. Such conversion elements are known from the prior art and can consist for example of doped phosphor. In this case, a converging lens element 8 is associated with the individual conversion elements, said converging lens element focusing the converted light radiation. An optical fiber 9 is also provided in each optical channel, said optical fiber leading the light focused by the corresponding converging lens element 8 to a respective secondary optical unit 10.

The individual secondary optical units generate different light distributions in order to realize different light functions. In the exemplary embodiment of FIG. 1, the secondary optical unit of the optical channel 6 generates a flashing light, the secondary optical unit of the optical channel 6' generates a daytime running light and the secondary optical unit of the optical channel 6" generates a turning light. Where appropriate, other or further light functions can also be realized by way of corresponding optical channels with associated secondary optical units. In particular, some of the low-beam light or the high-beam light can also be generated using a corresponding secondary optical unit.

In order to make it possible to generate a plurality of light functions using only the single laser light source 2, in the embodiment of FIG. 1, an optical element in the form of a tiltable mirror 5 is provided between the optical channels 6, 6', 6" and the laser light source 2, said mirror being realized as a very compact MEMS component. The tilting ability of the mirror 5 is indicated here by way of a double-headed arrow P. The mirror can be switched to three different switching positions by means of a control device 11, wherein in a first switching position the laser light of the laser light source is fed exclusively into the optical channel 6, in a second switching position exclusively into the optical channel 6' and in a third switching position exclusively into the optical channel 6". This is indicated in FIG. 1 by way of three separate beam paths for the respective optical channels and by way of the double-headed arrow P'.

In the embodiment of FIG. 1, the laser diode 3 generates blue laser light, wherein the laser diode can also where appropriate generate laser light with another wavelength. When the laser light is incident on the conversion element of the optical channel 6, said blue laser light is converted to yellow light, as a result of which a situation is achieved in which the flashing light illuminates in a yellow color. In contrast thereto, the conversion elements of the optical channels 6' and 6" are designed in such a way that white light is generated from the incident blue laser light in order to achieve as a result a situation in which the daytime running light and turning light are generated in the form of white light.

In accordance with the embodiment of FIG. 1, the switching positions of the mirror 5 are adjusted differently depending on the powered light function by means of the control device 11. If only one of the three light functions is activated, the mirror is brought by means of the control device into that switching position in which the laser light is led to the optical channel of the powered light function. If two or all three light functions are powered, the control device effects a cyclic change between the switching positions that guide light into the optical channels of the powered light functions. The change between the switching positions is effected here rapidly in such a way that it is not perceivable to the human eye. In this way, the parallel operation of a plurality of light functions using a single laser light source is made possible.

The embodiment just explained has been described based on an optical element in the form of a mirror that can be tilted to different switching positions. Nevertheless, the optical element can also be realized in another manner where appropriate. All that is crucial is that a different deflection of the light radiation of the laser light source into the various switching positions is effected. For example, the optical element can also be designed as an element with a variable refractive index, wherein the refractive index can be changed through a voltage feed.

The embodiment described in the preceding text has a number of advantages. In particular, a plurality of different light functions in parallel operation can be realized in a simple manner by using only a single laser light source. This is achieved with the aid of an optical element of compact design, which feeds the laser light to different optical channels by way of which the different light functions are realized. By using a single laser light source in combination with the compact optical element, the installation space of the lighting apparatus can be reduced significantly in comparison with conventional lighting apparatus.

LIST OF REFERENCE SIGNS

1 Lighting apparatus
2 Laser light source
3 Laser diode
4 Auxiliary optical unit
5 Optical element
6, 6', 6" Optical channels
7 Conversion elements
8 Converging lens elements
9 Optical fibers
10 Secondary optical units
11 Control device
P, P' Double-headed arrows The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lighting apparatus for a motor vehicle, comprising:
   a laser light source, from the light of which light radiation is generated into an area around the motor vehicle during operation of the lighting apparatus;
   a plurality of optical channels associated with the laser light source, wherein the light of the laser light source is guidable via each optical channel in order to generate in the area around the motor vehicle a separate light distribution associated with the optical channel from the guided light; and
   an optical element, which is switchable by way of a control device to different switching states, arranged between the laser light source and the plurality of optical channels, wherein a separate switching state is associated with each optical channel and, in a respective switching state, light of the laser light source is fed only into the optical channel with which the respective switching state is associated, by way of the optical element;
   wherein the control device is operable so as to cyclically switch over between at least two different switching states of the optical element, with the result that in one cycle the light of the laser light source is fed into at least two optical channels; and
   wherein a repetition frequency of cycles is between 50 Hz and 2000 Hz.

2. The lighting apparatus according to claim 1, wherein the laser light source comprises a single laser diode.

3. The lighting apparatus according to claim 1, wherein a separate optical unit belongs to each optical channel, to which separate optical unit guided light is led in the respective optical channel in order to generate the light distribution associated with the respective optical channel with the aid of the optical unit.

4. The lighting apparatus according to claim 1, wherein the separate light distributions represent different light functions of the motor vehicle.

5. The lighting apparatus according to claim 1, wherein the lighting apparatus is provided for generating light in the visible range, wherein the separate light distributions comprise one or more of the following light functions or parts thereof:
a flashing light, a daytime running light, a turning light, a parking light, a reverse light, a brake light, imagery in the surroundings of the motor vehicle, a low-beam light, a high-beam light.

6. The lighting apparatus according to claim 1, wherein the lighting apparatus is provided for generating light in the non-visible range, wherein the light is used for one or more driver assistance functions in the motor vehicle.

7. The lighting apparatus according to claim 1, wherein the repetition frequency of the cycles is between 500 and 2000 Hz.

8. The lighting apparatus according to claim 1, wherein the optical element comprises a movable mirror, which is movable into different switching positions corresponding to the switching states through actuation by way of the control device.

9. The lighting apparatus according to claim 1, wherein the optical element comprises a component with a variable refractive index, wherein the refractive index is changeable by way of the control device through variation of a voltage fed to the component and the different switching states are effected by the change in the refractive index.

10. The lighting apparatus according to claim 1, wherein the optical element is a MEMS component.

11. The lighting apparatus according to claim 1, wherein each optical channel comprises an optical waveguide, wherein the light originating from the laser light source is led in the optical waveguide.

12. The lighting apparatus according to claim 11, wherein each optical channel comprises a single optical fiber.

13. The lighting apparatus according to claim 1, wherein at least some of the optical channels comprise one or more conversion elements in order to convert the light of the laser light source from one wavelength range to another wavelength range.

14. The lighting apparatus according to claim 1, wherein the lighting apparatus comprises a light sensor system for sensing the light intensity in each optical channel, wherein the control device is configured so as to evaluate the sensed light intensity.

15. The lighting apparatus according to claim 14, wherein the control device is configured so as to adjust the switching states of the optical element with feedback to the light intensity sensed by the light sensor system so that in the respective switching state the light intensity in the optical channel in which light of the laser light source is fed in exceeds a predetermined threshold.

16. The lighting apparatus according to claim 15, wherein the control device is configured so as to detect a fault when the deviation between the light intensity, which is sensed by the light sensor system, in the optical channel in which light of the laser light source is fed in and a prescribed setpoint light intensity exceeds a predetermined threshold value, wherein the prescribed setpoint light intensity depends on the operating state of the lighting apparatus.

17. A motor vehicle, comprising one or more lighting apparatuses according to claim 1.

* * * * *